United States Patent
Williams

[15] 3,692,002
[45] Sept. 19, 1972

[54] ROTARY INTERNAL COMBUSTION ENGINE

[72] Inventor: Robert H. Williams, Rt. 2, Bandera, Tex. 78003

[22] Filed: Feb. 8, 1971

[21] Appl. No.: 113,189

[52] U.S. Cl. .................123/8.11, 418/113, 418/250
[51] Int. Cl. ........................F01c 19/02, F02b 53/10
[58] Field of Search ...123/8.09, 8.11, 8.13; 418/250, 418/248, 251, 113, 117

[56] References Cited

UNITED STATES PATENTS

| | | |
|---|---|---|
| 888,324 | 3/1908 | MacLean..............418/179 X |
| 2,762,346 | 9/1956 | White....................418/249 X |
| 1,406,140 | 2/1922 | Anderson..............418/249 X |
| 3,450,108 | 6/1969 | Rich........................123/8.35 |
| 2,475,391 | 7/1949 | Johnson.................418/179 X |
| 2,412,949 | 12/1946 | Bronn et al. ..........123/8.13 X |

*Primary Examiner*—William E. Wayner
*Attorney*—Dana E. Keech

[57] ABSTRACT

A rotary engine having a cycle which includes the phases of pre-compressed fuel injection, combustion-expansion and exhaust and including a stator in which a cylindrical cavity is formed concentric with a given axis, a shaft being mounted on axial bearings of said stator to support a rotor within said cavity having three circumferentially spaced head portions, higher radially than the intervening peripheral portions and closely rotatably slideably fitting said cavity. Two diametrically opposed combustion stations are provided at opposite points in said stator, each said station including a pocket in the face of said cavity in an area small enough to be practically sealed shut when one of said rotor head portions is traveling past said area. An abutment holding chamber is formed radially outwardly in said cavity just in advance of each combustion pocket area, an abutment rocker being pivotally mounted in each chamber and biased into constant line sealing contact with said rotor. Spent gas exhaust ports are provided just behind these abutments. High compression fuel injection means is cam operated to inject a fuel charge into each pocket while the latter is shut and ignite this just before it is uncovered. Each abutment is jointly biased against the rotor by spring and gaseous pressure. Fuel and air are separately injected into said combustion pockets in timed relation with the rotation of said rotor in accordance with conventional diesel fuel injection procedures.

3 Claims, 3 Drawing Figures

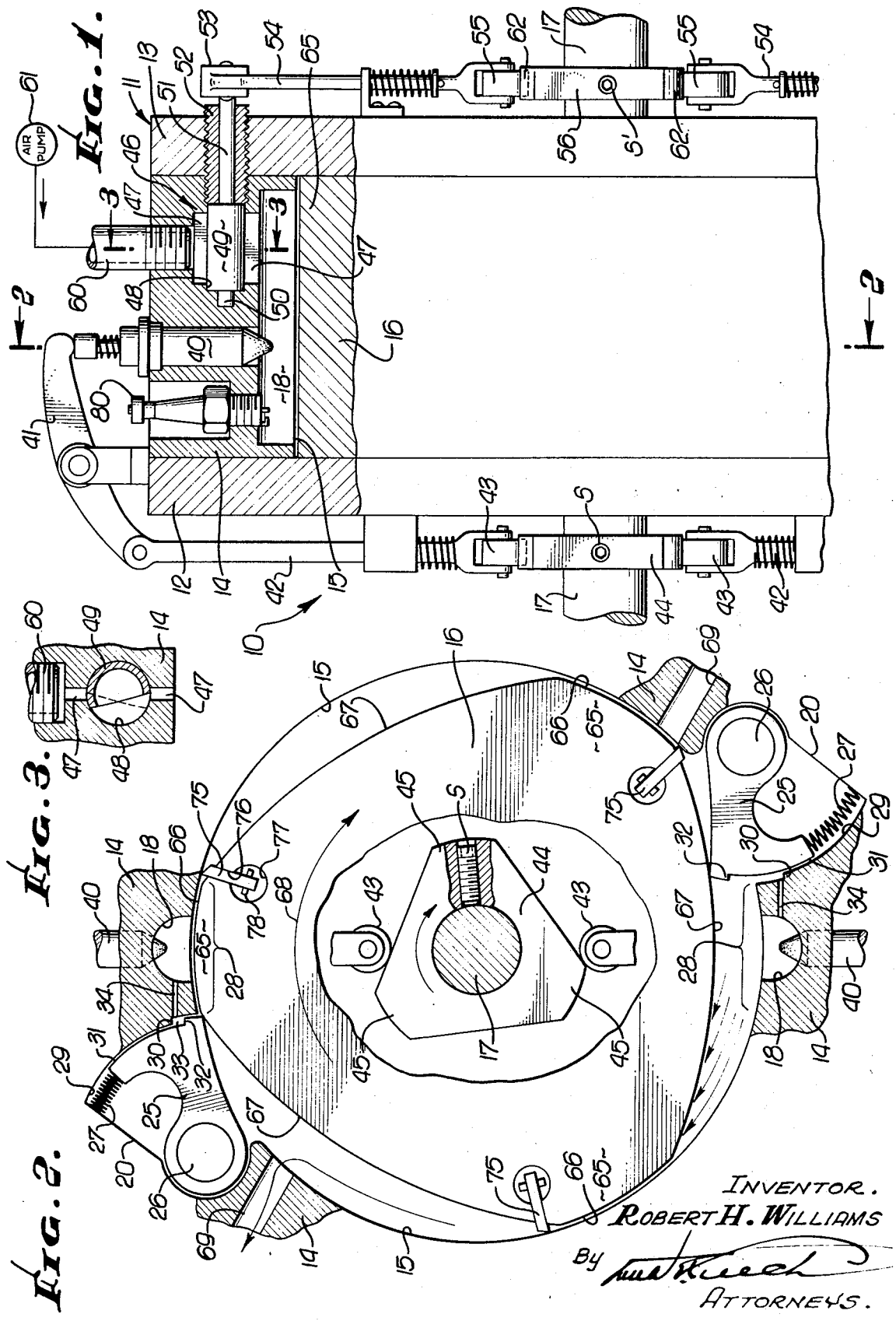

3,692,002

ROTARY INTERNAL COMBUSTION ENGINE

SUMMARY OF THE INVENTION

The recent sky-rocketing success of the Japanese automobile embodying a rotary internal combustion engine and licensed under U.S. Letters Pat. to Wankel No. 2,988,065 has emphasized tremendous unexpected scientific and financial windfalls waiting to be harvested in this long overlooked field of engineering.

The Wankel rotary combustion engine is still relatively complex and unorthodox in design requiring highly skilled technicians to build and maintain the same.

It is an object of the present invention to apply the simple, tried and proven principles of the direct fuel injection diesel motor to the field of rotary combustion engine design and thus produce a very efficient and inexpensive source of power which can operate on low grade fuels with a very minimum amount of pollution gases being produced.

It is another object to provide a rotary internal combustion engine producing six power impulses per revolution of the shaft of one unit and in which the rotor of a single unit is balanced, thus giving an abundant smooth flow of power in an engine of relatively small size.

BRIEF DESCRIPTION OF THE DRAWINGS

FIG. 1 is a diagrammatic fragmentary side elevational view of the preferred embodiment of the invention partly broken away to show the mechanism for delivering compressed air and injecting liquid fuel into one of the combustion pockets of the engine in timed relation with the rotation of the engine rotor.

FIG. 2 is a fragmentary diagrammatic sectional view taken on the line 2—2 of FIG. 1 and showing the two combustion stations of the stator of the invention and three combustion sealing heads provided on the rotor of the invention.

FIG. 3 is a fragmentary sectional detail view taken on the line 3—3 of FIG. 1, and shows the cam valved compressed air feeder of the invention.

DETAILED DESCRIPTION OF THE PREFERRED EMBODIMENT

The present invention is shown in the drawings as embodied in a rotary internal combustion engine 10 which includes a stator 11 made up of side walls 12 and 13 and a peripheral wall 14, said walls forming a cylindrical cavity 15 in which a rotor 16 is rotatably mounted on a shaft 17, suitable bearings of which are provided for in the side walls 12 and 13.

Two combustion pockets 18 are formed outwardly in cylindrical cavity 15 at diametrically opposite points therein, these pockets being formed parallel with shaft 17 and terminating a short distance at their opposite ends from side walls 12 and 13 as shown in FIG. 1. A short distance in a counter-clockwise direction from each of the pockets 18, the cylindrical cavity 15 is provided with an abutment housing chamber 20 which is parallel with shaft 17 and extends entirely through the peripheral wall 14, each of these chambers being shaped to house one of a pair of abutments 25 pivotally mounted on a shaft 26 and biased by a spring 27 into a sealing line contact with the periphery of rotor 16 at the counter-clockwise edge of one of two transverse areas 28 of the cavity 15, in the middle of each of which one of the combustion pockets 18 is located.

Each abutment housing 20 has an arcuate face 29 concentric with its shaft 26, said face having a step 30 provided therein and the abutment 25 mounted in said chamber has an arcuate face 31 with a step 32 which makes a close sliding fit with a corresponding mouth portion of the arcuate face 29. A recess 33 is thus formed between each abutment 25 and the arcuate chamber face 29 and between the steps 30 and 32 which fluctuates in volume as said abutment is biased varying distances from the housing 20 in order to maintain contact with the rotor 16. This recess is connected by a small duct 34 with the adjacent combustion pocket 18.

A small portion of the gases of combustion formed in these combustion pockets thus flows through the duct 34 leading from that pocket to the adjacent recess 3, thus building up the gas pressure in said recess which, applied to abutment step 32, adds to the forces biasing said abutment against said rotor.

Each of the combustion pockets 18 is provided with a diesel type liquid fuel injection nozzle 40 which is actuated by a rocker 41 pivotally mounted on the stator 11 and connected by a rod 42 with a roller 43 which rides on a cam 44 adjustably mounted on shaft 17 by a set screw S. The cam 44 is provided with three lobes 45, each of which lifts the roller 43 to actuate the fuel injection nozzle 40 to inject a charge of fuel into its combustion pocket 18 as that lobe passes under said roller 43.

Each combustion pocket 18 also has a cam-controlled compressed-air three feeder 46 including a slot 47 which contains the axis of a bore 48 for confining a tubular valve member 49 which is mounted on trunnion 50 at its inner end and has a shaft 51 journaling in a threaded bearing 52 and carrying a crank arm 53 on its outer end. Pivotally connected at its upper end with the crank arm 53 is a connecting rod 54, the lower end of which supports a roller 55 which rides on a cam 56 adjustably mounted on shaft 17 by a set screw S'.

Slightly less than one-half of the tubular valve member 49 is machined away as shown in FIG. 3 so that it is impossible when cam rotating the member 49 in bore 48 to connect upper and lower portions of the slot 47 with each other. In other words, only one of these slot portions can be connected with the bore 48 at one time. The lower end portion of slot 47 opens into the adjacent combustion pocket 18 and the upper portion of said slot connects with a pipe 60 which leads to an air compression pump 61. The cam 56 is provided with three lobes 62 equally spaced circumferentially thereon so that the air feeder 46 functions to store up a charge of air under high pressure in the bore 48 and then discharges this charge of highly compressed air into the combustion pocket 18 connected therewith in conjunction with the injection of fuel through the injector 40 into said pocket whereby, in accordance with conventional diesel practice, the mixture of said fuel with said compressed air produces combustion of the charge and supplies the motive force for the engine 10.

The rotor 16 has the periphery thereof shaped to divide the same into three pistons 65, each piston at the apex thereof providing a cylindrical surface 66 concentric with the axis of shaft 17 and substantially equal in area to the transverse area 28 aforesaid and shown in FIG. 2. The peripheral areas 67 disposed between the pistons 65 have smooth curved surfaces which, like the cylindrical faces of the pistons 65, extend uniformly the full length of rotor 16. The cylindrical faces of pistons 65 are shaped to form a close sliding fit with the cylindrical cavity 15 in the stator 11, although it is necessary in diagrammatically illustrating these surfaces in FIG. 2 of the drawing, to show a slight space between these two surfaces. This of course is greatly in excess of the actual spacing of these surfaces in the engine.

As a matter of fact, the heads of pistons 65 travel so closely to the cylindrical cavity 15 that when one of these heads is disposed opposite one of the transverse areas 28 of said cavity it closes the combustion pocket 18 formed in said area so that the air and fuel delivered into said pocket during the time it is thus closed by said piston produces a pressure in said pocket sufficient to ignite the fuel so that, as the piston 65 closing the pocket and precipitating this combustion moves out of covering relation with said pocket in a clockwise direction, as indicated by the arrow 68, the combustion gases produced by this explosion expand into pressural relation with the reverse face of this piston and is confined by the adjacent abutment 25 in this pressural relation with said piston so as to transmit the full expansive power of these combustion gases in applying torque to the rotor 16 in a clockwise direction.

As the piston 65, involved in the production of the impulse stroke just described, moves away from the combustion pocket 18 in which the combustion took place (as shown in the lower half of FIG. 2), the adjacent abutment 25 swings inwardly a substantial distance out of its housing chamber 20 in order to maintain its biased sealing pressure against the adjacent peripheral surface 67 of rotor 16, the step 32 of this abutment is exposed to the combustion gases engaging said abutment to apply torque force to said abutment tending to force the same into pressural relation with the adjacent peripheral surface 67 of the rotor 16. This torque force is designedly to maintain the proper seal between the abutment and the rotor required to confine the fuel gases against reverse movement and thereby utilizing the maximum portion of the expansive energy of these gases in producing clockwise torque forces in the rotor 16.

Conventional exhaust passages 69 are provided in peripheral wall 14 just behind abutment housing chambers 20, the exhaust gases flowing freely through said passages and being conducted to a suitable muffler by an exhaust manifold (not shown).

Attention is directed to the simplicity of the subject invention; to the full 110° expansion stroke achieved thereby; to the fact that each unit such as that disclosed herein has a fully balanced rotor; that 6 power impulses are produced for each revolution; successive impulses overlapping each other; and to the fact that very slight movement of the abutments is required thereby greatly reducing the noise and wear produced by these.

The rotor 16 of the invention is optionally provided with sealing vanes 75, one of which is mounted just in advance of each of the pistons 65 in a transverse slot 76 formed in the rotor 16 which communicates at its inner edge with a bore 77 provided in said rotor. Each vane 75 has a reversely beveled outer edge and is limited in its outward movement by a row of pins 78 which engage the wall of the bore 77 when the vane 75 provided with these pins shifts outwardly through the slit 76 a slightly greater distance than the normal position of the vane when it is making a sliding line-sealing engagement with the stator cavity 15 of the stator 14.

When the rotor 16 is equipped with sealing vanes 75 these supplement the sealing functions performed by the concentric faces 66 of the pistons 65 when these are respectively opposite an area 28 of the stator cavity 15, As a matter of fact, when the rotor 16 is equipped with sealing vanes 75, a considerably lower tolerance may be indulged in the spacing between the piston head surfaces 66 and said stator cavity because each selling vane 75 makes an even better seal with the cavity 15 than the piston 65 with which said vane is associated.

While one of the principal objects of the present invention is to provide an engine receiving fuel by injection in accordance with conventional diesel practice, the engine 10 is also adapted to receive by injection high octane fuels along with compressed air injected coordinately therewith and to fire these fuel charges with conventional spark plugs such as spark plug 80 shown in FIG. 1. This plug is preferably mounted in the peripheral wall 14 of the stator 11 so as to provide an igniting spark in the combustion pocket 18 with which it is associated, there being of course one of these plugs for each of these pockets. The energizing of spark plugs 80 is controlled by a conventional high tension electric ignition system driven in timed relation with the rotation of shaft 17.

I claim:

1. A rotary internal combustion engine having a cycle which includes the phases of pre-compressed-fuel injection, combustion-expansion and exhaust, said engine comprising:

an outer body having spaced end walls and a peripheral wall interconnecting said end walls to define between said walls a cavity having an axis along which said end walls are spaced, the inner surface of said peripheral wall having a profile which is coaxial with said axis;

an inner body received within said outer body cavity and supported for relative rotation with respect to said outer body about the axis of said outer body cavity;

said inner body having at least one piston head subtending a substantial area of said cavity, the peripheral surface of said head being disposed in close juxtaposition with the surface of said cavity, the radius of the peripheral surface of said inner body decreasing circumferentially in both directions from said head;

means providing a transversely disposed combustion pocket opening radially outwardly from said cavity, the circumferential dimension of said pocket being small enough to be fully covered by said inner body head when the latter is disposed opposite said area the radial dimension of said pocket being substantially less than said circumferential dimension;

means providing an abutment enclosing chamber formed radially outward in said peripheral wall a short distance behind said pocket;

abutment means mounted in said chamber including an abutment and means for biasing said abutment inwardly from said chamber into line-sealing contact with the periphery of said inner body;

means for the escape of exhaust gases accummulating between said inner body and outer body just behind said abutment; and means connecting radially with said pocket at transversely spaced intervals for injecting a combustible fuel charge in said pocket in proper timed relation with the rotation of said inner body and accomplishing the firing of said charge substantially contemporaneously with the uncovering of said pocket by said piston head.

2. A combination as recited in claim 1 wherein said means for biasing said abutment inwardly from said abutment chamber into line sealing contact with the periphery of said body includes an unbalanced lip formed on the edge portion of said abutment contacting said inner body, said lip being exposed to the combustion gases formed in said pocket to impart a torque to said abutment which increases the pressure of said abutment against said inner body.

3. A combination as recited in claim 2 wherein said abutment makes a smooth sliding fit in said abutment chamber, there being a step formed in the mouth of said abutment chamber which interfits with said lip, the latter making a smooth sliding fit therewith to enclose a recess between said abutment and said step when said inner body swings said abutment outwardly into said abutment chamber;

there being a duct in said peripheral wall connecting said combustion pocket with said recess for admitting combustion gases from said pocket to said recess and into contact with said abutment lip.

* * * * *